June 16, 1964 E. M. JAMGOCHIAN 3,137,175
ACCELERATION-TIME INTEGRATOR
Filed April 12, 1963 2 Sheets-Sheet 1

INVENTOR.
EDWARD M. JAMGOCHIAN
BY
Lawrence S. Galka
ATTORNEYS

June 16, 1964

E. M. JAMGOCHIAN 3,137,175

ACCELERATION-TIME INTEGRATOR

Filed April 12, 1963

INVENTOR.
EDWARD M. JAMGOCHIAN
BY
ATTORNEYS

United States Patent Office 3,137,175
Patented June 16, 1964

1

3,137,175
ACCELERATION-TIME INTEGRATOR
Edward M. Jamgochian, Stoneham, Mass., assignor to the United States of America as represented by the Secretary of the Air Force
Filed Apr. 12, 1963, Ser. No. 272,813
10 Claims. (Cl. 73—503)

This invention relates in general to accelerometers, and in particular to an improved integrating accelerometer.

An integration of acceleration over the time experienced may be satisfactorily accomplished by devices utilizing a piston-mass activated by the acceleration to displace a viscous fluid through a metering orifice. Whereas, the time integrant, or rate of fluid displacement, is dependent upon the pressure applied by the piston and thus also dependent upon acceleration, the displacement of a known fluid volume yields an accurate summation of time and acceleration.

It is highly desirable that such devices be able to discriminate between certain accelerations. For instance, it may be purposeful to delay commencement of integration until a predetermined acceleration is experienced. Therefore, transient shock and vibration accelerations as well as certain prolonged low value accelerations must be ignored. Furthermore, it is of import that the device be accurate, reliable, and adapted for miniaturization.

Thus, it is an object of this invention to provide an accurate and reliable acceleration-time integrator.

It is an object of the invention to provide an integrating accelerometer device which, although sensing other accelerations, delays integration until a desired acceleration is attained, and which allows an integration, once commenced to continue unimpaired for all acceleration thereafter experienced.

Another object is to provide improved temperature compensation enabling the device to integrate accurately and uniformly over a range of environmental temperatures.

A further object is to provide a device adapted for miniaturization, and which is economical to produce, utilizing conventional, currently available materials that lend themselves to standard mass production manufacturing techniques.

Other objects and a fuller understanding of the invention may be had by referring to the following description and claims, taken in conjunction with the accompanying drawings in which:

Figure 1:
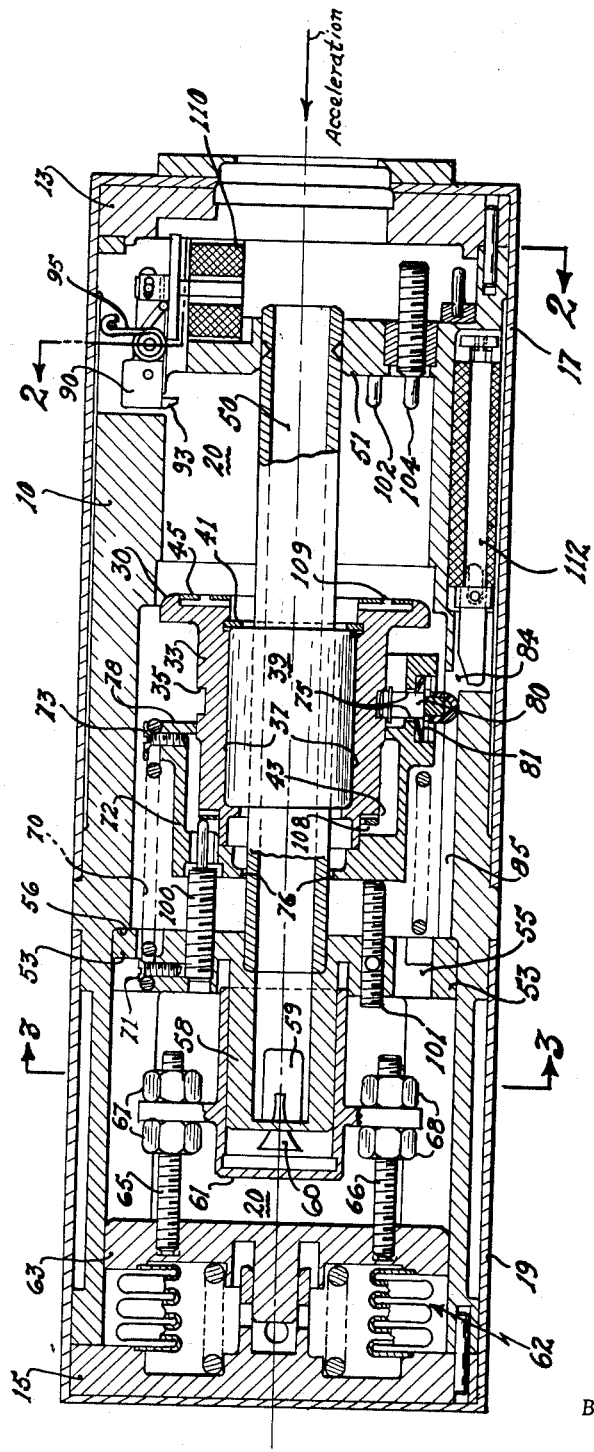
FIGURE 1 is a cross-section of the invented acceleration-time integrator.

With reference to the drawings, a hollow cylindrical housing 10 is hermetically sealed at both ends by caps 13 and 15 together with an outer casing at 17 and 19. As indicated, a series of concentric bores within housing 10 forms the enclosed chamber 20, which contains an inert fluid therein. Preferably the fluid is a liquid having a high coefficient of viscosity, and a relatively small variation of viscosity with temperature, for example, hydrofluorocarbon oils or silicone oils.

A piston-mass 30 is concentrically fitted within chamber 20 to slide with a close tolerance along the innermost bore of housing 10. The piston 30 includes, as shown, a concentric reduced portion 33 with a peripheral groove 35 thereabout. An axial bore 37 through the piston, contains a ball bushing 39, secured there, as shown, by retainer ring 41. The opposite sides of piston 30 present contacting surfaces indicated on the drawing as first face 43 and a second face 45.

Figure 2:
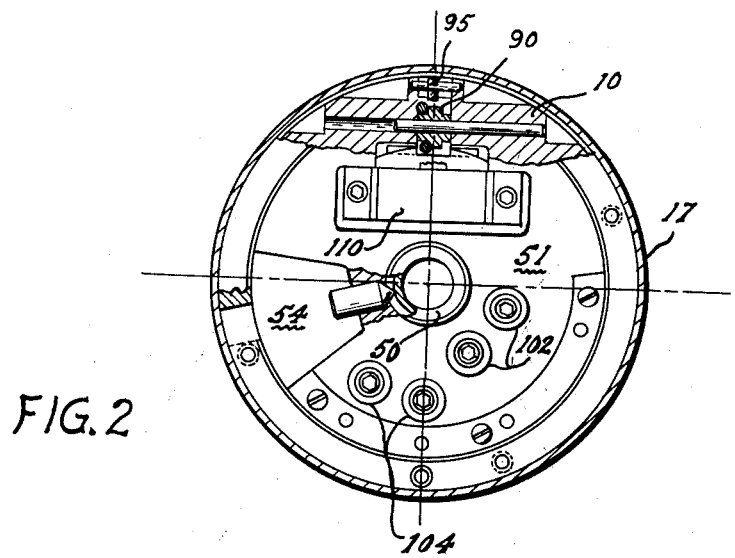
FIGURE 2 is a sectional view taken on line 2—2 of FIGURE 1.
Figure 3:
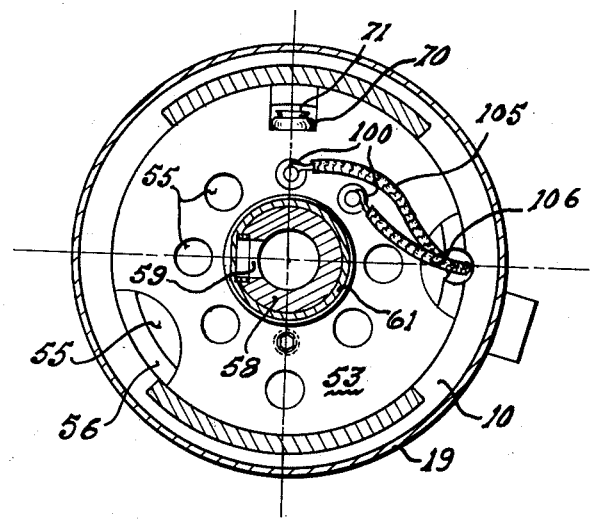
FIGURE 3 is a sectional view taken on line 3—3 of FIGURE 1.

Fluid conduit means allow the displacement of fluid from one side to the other of piston 30 and are provided by a length of conduit tubing 50, which extends with a sliding, close tolerance fit through ball bushing 39. Annular spacers 51 and 53 suspend tubing 50 at a central axis through housing 10 by securing the tubing ends in a suitable manner, such as a press fit thereat. Both annular spacers are secured at a position in chamber 20, as shown, spacer 51 being an integral part of the housing 10 and spacer 53 abutting against housing shoulder 56. Suitable openings, through the spacers shown at 54, 55, in FIGURES 2 and 3, are provided to allow flow of fluid from chamber 20, through conduit 50. Spacer 53 includes the tubular continuation 58 of conduit tubing 50, which is enclosed but for the rectangular side opening 59.

A desired time rate of displacement may be effectuated by constricting opening 59. Therefore, a metering orifice 60 is provided through the side of enclosed sleeve 61 which slides over the continuation 58 of tubing 50 to position a portion of orifice 60 opposite opening 59. As illustrated, orifice 60 has a symmetrically curved shape, the curved portion conforming to the viscosity-temperature curve of the particular fluid utilized. Naturally, the telescoping of sleeving 61 and orifice 60 with respect to continuation 58 and opening 59, respectively, will cause a change in the orifice area. Temperature compensation may thus be accomplished by utilizing a thermostatic means, for example, a bimetallic element, which changes the orifice area in proportion to the temperature changes. For this purpose, a spring loaded bellows assembly, indicated generally at 62, is connected to sleeve 61 from diaphragm disk 63 through studs 65, 66 and accompanying nuts 67, 68.

An elastic means, in this instance extension spring 70, biases piston 30 to the initial position shown. One end of spring 70 is anchored to spacer 53 by machine screw 71. Receiver ring 72 is affixed by machine screw 73 to the remaining end of spring 70. The reduced piston portion 33 is encompassed by ring 72 which has a radial opening 75 at a position opposite peripheral groove 35, as illustrated. Axial opening 76 allows ring 72 to slide in relation to tubing 50, and the annular flange 78 has been provided for guidance therein of piston 30.

Detent means for separating the piston from its biasing after a predetermined displacement are provided at the detent plunger 80 which connects piston 30 to receiver ring 72 by extending through opening 75 and into peripheral groove 35. A conical spring 81 biases plunger 80 radially outward away from groove 35, however, disengagement from groove 35 is prevented since the plunger bears against housing 10. A space extending radially outward in housing 10 is provided at detent well 84 so that a displacement of piston 30 will place plunger 80 over well 84, allowing the plunger to move outwardly to disengage from groove 35. Channel 85 in housing 10 aligns and leads the plunger 80, upon displacement, to well 84.

Now, free of biasing, piston-mass 30, responding to acceleration, continues traveling and displacing fluid until reaching a final position at spacer 51. On approaching the final position, the piston engages latch 90, at the incline of catch lug 93, and lifts the latch against spring 95. The latch 90 returns downward with catch lug 93 behind piston 30 to lock it at the final position.

A first sensing means, the plunger type switch contact 100, extends through spacer 53 and ring 72, as illustrated, to contact first surface 43 of piston 30 at the initial position. Stud 101, threaded through spacer 53, is provided to afford an initial position adjustment. A second sensing means is provided at the final position by plunger switch contacts 102, 104, extending through spacer 51. External circuits (not shown) may be energized by appropriate wire connections similar to those shown at 105, 106, of FIGURE 3 to contacts 100, 102, and 104. A variety of switching functions may be performed by bonding an insulating material which has been conventionally embossed with suitable printed circuits 108, 109 at faces 43 and 45 respectively.

Solenoid 110 is provided to unlock piston 30 from the final position by lifting latch 90. Applying a reverse acceleration will return the piston within retainer ring 72. A second solenoid 112 is provided to lift detent plunger 80 out of detent well 84, thereby allowing the bias of spring 70 to return the piston-mass 30 to the initial position with the printed circuit 108 of face 43 contacting switch 100.

During operation of the device, all accelerations displacing piston 30 will be sensed at switch contact 100. Intergration will not commence if the acceleration value is not sufficient to overcome the bias of spring 70 or if the acceleration duration is not sufficient to displace enough fluid. However, a predetermined sufficient, acceleration, will move piston 30, extending spring 70 and moving plunger 80 along channel 85. As piston 30 passes well 84, plunger 80 disengages and enters the well. Receiver ring 72 and spring 70 are thus locked in an extended position at well 84. Piston-mass 30 is free from bias and integration commences, the fluid displacing through tubing 50 and out orifice 60. Naturally, any change in temperature will cause the confined fluid to expand or contract. The spring loaded bellows 62 will respond to the resulting pressure change by a movement of diaphragm disk 63, thereby causing a temperature compensation at orifice 60. Displacement of the piston and fluid, in response to acceleration, continues until the piston reaches a final locked position sensed at contact switches 102, 104, whereupon the integration is completed.

Although the invention has been described with reference to a particular embodiment, it will be understood to those skilled in the art that the invention is capable of a variety of alternative embodiments within the spirit and scope of the appended claims.

I claim:

1. An acceleration-time integrator, comprising: a housing enclosing a chamber containing inert fluid therein; a piston mass within said chamber; fluid conduit means allowing displacement of said fluid and piston at a desired time rate; an elastic means for biasing said piston to an initial position within said chamber; detent means between said piston and elastic means for separation thereof upon a predetermined displacement of said piston from said initial position thereby freeing said piston from said biasing for further displacement to a final position; and sensing means positioned in said housing to contact said piston at said final position.

2. An acceleration-time integrator, comprising: a housing enclosing a cylindrical chamber with a detent well extending radially outward therefrom, said chamber containing a viscous fluid therein; a piston mass having a peripheral groove within said chamber; fluid conduit means allowing displacement of said fluid and piston at a desired time rate; a spring assembly anchored in said chamber and having a detent receiver opening in alignment with said well at one side thereof; a detent plunger extending through said receiver opening and within said groove to connect said spring for biasing of said piston to an initial position; means biasing said plunger radially outward against said housing and away from said groove into said well upon displacement of said piston from said initial position past said well, thereby freeing said piston from said spring for further displacement to a final position; and sensing means positioned in said housing to contact said piston at said final position.

3. An acceleration-time integrator, comprising: a housing enclosing a cylindrical chamber with a detent well extending radially outward therefrom, said chamber containing a viscous fluid therein; a piston-mass within said chamber, said piston including a reduced portion having a peripheral groove; fluid conduit means allowing displacement of said fluid and piston at a desired time rate; a spring anchored in said chamber; a receiver ring affixed to said spring and encompassing said reduced portion, said ring having a radial opening opposite said groove and in alignment with said well at one side thereof; a detent plunger extending through said opening and within said groove to connect said spring for biasing of said piston to an initial position; means biasing said plunger radially outward against said housing and away from said groove into said well upon displacement of said piston from said initial position past said well, thereby freeing said piston from said spring for further displacement to a final position; and sensing means positioned in said housing to contact said piston at said final position.

4. An acceleration-time integrator, comprising: a housing enclosing a cylindrical chamber with a detent well extending radially outward therefrom, said chamber containing a viscous fluid therein; a piston-mass within said chamber, said piston including a reduced portion with a peripheral groove and having an axial bore therethrough; a conduit tubing axially positioned in said chamber and extending through said bore, said tubing having a closed end with a metering orifice thereat allowing displacement of said fluid and piston at a desired time rate; a spring anchored in said chamber; a receiver ring affixed to said spring and encompassing said reduced portion, said ring having a radial opening opposite said groove and in alignment with said well at one side thereof; a detent plunger extending through said opening and within said groove to connect said spring for biasing of said piston to an initial position; a means biasing said plunger radially outward against said housing and away from said groove into said well upon displacement of said piston from said initial position past said well, thereby freeing said piston from said spring for further displacement to a final position; and sensing means positioned in said housing to contact said piston at said final position.

5. An acceleration-time integrator, comprising: a housing enclosing a cylindrical chamber with a detent well extending radially outward therefrom, said chamber containing a viscous fluid therein; a piston-mass within said chamber, said piston including a reduced concentric portion with a peripheral groove and having an axial bore lined with a bushing therethrough; a conduit axially positioned in said chamber and extending through said bushing, said tubing having a closed end with a metering orifice thereat allowing displacement of said fluid and piston at a desired time rate; an extension spring anchored in said chamber at one side of said well; a receiver ring affixed at one end of said spring and encompassing said reduced portion, said ring having a radial opening opposite said groove and in alignment with said well at one side thereof; a detent plunger extending through said opening and within said groove to connect said spring for biasing of said piston to an initial position; means biasing said plunger radially outward against said housing and away from said groove into said well, upon displacement of said piston from said initial position past said well, thereby freeing said piston from said spring for further displacement to a final position; and sensing means positioned in said housing to contact said piston at said final position.

6. An acceleration-time integrator, comprising: a housing enclosing a cylindrical chamber with a detent well extending radially outward therefrom, said chamber containing a viscous liquid therein; a piston-mass within said chamber, said piston including a reduced concentric end portion with a peripheral groove and having a face embossed with a printed electrical circuit and having an axial bore lined by a bushing therethrough, a conduit tubing axially positioned in said chamber and extending through said bushing, said tubing having a closed end with a temperature compensating orifice thereat allowing displacement of said liquid and piston at a desired time rate; an extension spring anchored at one end in said chamber on one side of said well; a receiver ring affixed at a remaining end of said spring and encompassing said reduced portion, said ring having a radial opening opposite said groove and in alignment with said well at one side thereof; a detent plunger extending through said opening and within said groove to connect said spring for biasing of said piston to an initial position; means biasing said plunger radially outward against said housing and away from said groove into said well upon displacement of said piston from said initial position past said well, thereby freeing said piston from said spring for further displacement to a final position; and sensing means positioned in said housing to contact said printed circuit at said final position.

7. An acceleration-time integrator, comprising: a housing enclosing a cylindrical chamber with a detent well extending radially outward therefrom, said chamber containing a viscous liquid therein; a piston-mass within said chamber, said piston including a reduced concentric end portion with a peripheral groove and having a face embossed with a printed electrical circuit and having an axial bore lined by a bushing therethrough; a conduit tubing axially positoned in said chamber and extending through said bushing; an enclosed sleeve sliding on one end of said tubing, said sleeve having a metering orifice of curved temperature compensating shape allowing displacement of said liquid and piston at a desired time rate; thermostatic means for telescoping said sleeve and orifice shape to present an orifice area proportioned to temperature; an extension spring anchored at one end in said chamber on one side of said well; a receiver ring affixed at remaining end of said spring and encompassing said reduced portion, said ring having a radial opening opposite said groove and in alignment with said well at one side thereof; a detent plunger extending through said opening and within said groove to connect said spring for biasing of said piston to an initial position; means biasing said plunger radially outward against said housing and away from said groove into said well upon displacement of said piston from said initial position past said well, thereby freeing said piston from said spring for further displacement to a final position; and sensing means positioned in said housing to contact said printed circuit at said final position.

8. An acceleraton-time integrator, comprising: a housing enclosing a cylindrical chamber with a detent well extending radially outward therefrom, said chamber containing a viscous liquid therein; a piston-mass within said chamber, said piston including a reduced concentric end portion with a peripheral groove and having a face embossed with a printed electrical circuit and having an axial bore lined by a bushing therethrough; a conduit tubing axially positioned in said chamber and extending through said bushing; an enclosed sleeve sliding on one end of said tubing, said sleeve having a metering orifice of curved temperature compensating shape allowing displacement of said liquid and piston at a desired time rate; a pressure sensing bellows affixed in said housing to bear on said sleeve, said bellows responding to temperature change by telescoping said sleeve and orifice shape to present an orifice area proportional to temperature; an extension spring anchored at one end in said chamber on one side of said well; a receiver ring affixed at remaining end of said spring and encompassing said reduced portion, said ring having a radial opening opposite said groove and in alignment with said well at one side thereof; a detent plunger extending through said opening and within said groove to connect said spring for biasing of said piston to an initial position; a first sensing means positioned in said housing to contact said printed circuit at said initial position; means biasing said plunger radially outward against said housing and away from said groove into said well upon displacement of said piston from said initial position past said well, thereby freeing said piston from said spring for further displacement to a final position; and a second sensing means positioned in said housing to contact said printed circuit at said final position.

9. An acceleration-time integrator, comprising: a housing enclosing a cylindrical chamber with a detent well extending radially outward therefrom, said chamber containing a viscous liquid therein; a piston-mass within said chamber, said piston including a reduced concentric end portion with a peripheral groove and having an axial bore lined by a bushing therethrough, and said piston defining a first face and a second face, both embossed with a printed electrical circuit; a conduit tubing axially positioned in said chamber and extending through said bushing; an enclosed sleeve sliding on one end of said tubing, said sleeve having a metering orifice of curved temperature compensating shape allowing displacement of said liquid and piston at a desired time rate; a pressure sensing bellows affixed in said housing to contact said liquid and bear on said sleeve, said bellows responding to temperature change by telescoping said sleeve and orifice shape to present an orifice area proportional to temperature; an extension spring anchored at one end in said chamber on one side of said well; a receiver ring affixed at remaining end of said spring and encompassing said reduced portion, said ring having a radial opening opposite said groove and in alignment with said well at one side thereof; a detent plunger extending through said opening and within said groove to connect said spring for biasing of said piston to an initial position; a first sensing means positioned in said housing to contact said printed circuit of said first face at said inital position; means biasing said plunger radially outward against said housing and away from said groove into said well upon displacement of said piston from said initial position past said well, thereby freeing said piston from said spring for further displacement to a final position; a second sensing means positioned in said housing to contact said printed circuit of said second face at said final position; and latch means for locking said piston at said final position.

10. An acceleration-time integrator, comprising: a housing enclosing a cylindrical chamber with a detent well extending radially outward therefrom, said chamber containing a viscous liquid therein; a piston-mass within said chamber, said piston including a reduced concentric end portion with a peripheral groove and having an axial bore lined by a bushing therethrough, and said piston defining a first face and a second face, both embossed with a printed electrical circuit; a conduit tubing axially positioned in said chamber and extending through said bushing; an enclosed sleeve sliding on one end of said tubing, said sleeve having a metering orifice of curved temperature compensating shape allowing displacement of said liquid and piston at a desired time rate; a pressure sensing bellows affixed in said housing to contact said liquid and bear on said sleeve, said bellows responding to temperature change by telescoping said sleeve and orifice shape to present an orifice area proportional to temperature; an extension spring having an end anchored in said chamber at one side of said well; a receiver ring affixed at remaining end of said spring and encompassing said reduced portion, said ring having a radial opening opposite said groove and in alignment with said well at one side thereof; a detent plunger extending through said opening and within said groove to connect said spring for biasing of said piston to an initial position; a first sensing means positioned in said housing to contact said printed circuit of said first face at said initial position; means biasing said plunger radially outward against said housing and away from said groove into said well upon displacement of said piston from said initial position past said well, thereby freeing said piston from said spring for further displacement to a final position; a second sensing means positioned in said housing to contact said printed circuit of said second face at said final position; latch means for locking said piston at said final position; and solenoid means for unlocking said latch means and lifting said plunger out of said well to allow said piston to return to said initial position.

No references cited.